US010165428B2

(12) United States Patent
Arzelier (10) Patent No.: US 10,165,428 B2
(45) Date of Patent: Dec. 25, 2018

(54) METHOD AND DEVICE FOR MANAGING WARNING NOTIFICATIONS (75) Inventor: Claude Jean-Frederic Arzelier, Cannes (FR)

(73) Assignee: BlackBerry Limited, Waterloo, Ontario (CA)

( * ) Notice: Subject to any disclaimer, the term of this patent is extended or adjusted under 35 U.S.C. 154(b) by 38 days.

(21) Appl. No.: 14/236,803

(22) PCT Filed: Aug. 5, 2011

(86) PCT No.: PCT/IB2011/002488
§ 371 (c)(1),
(2), (4) Date: Feb. 3, 2014

(87) PCT Pub. No.: WO2013/021232
PCT Pub. Date: Feb. 14, 2013

(65) Prior Publication Data
US 2014/0179258 A1 Jun. 26, 2014

(51) Int. Cl.
H04W 4/90 (2018.01)
H04W 76/50 (2018.01)
H04W 60/00 (2009.01)

(52) U.S. Cl.
CPC ............ H04W 4/90 (2018.02); H04W 76/50 (2018.02); H04W 60/00 (2013.01)

(58) Field of Classification Search
CPC ...... H04W 4/22; H04W 60/00; H04W 76/007
See application file for complete search history.

(56) References Cited

U.S. PATENT DOCUMENTS

| | | | |
|---|---|---|---|
| 2006/0094415 A1* | 5/2006 | Veron | H04W 48/02 455/419 |
| 2006/0245731 A1* | 11/2006 | Lai | H04N 5/765 386/224 |
| 2008/0186953 A1* | 8/2008 | Buckley | H04Q 11/0457 370/352 |
| 2010/0035575 A1* | 2/2010 | Wu | H04W 4/22 455/404.1 |
| 2011/0086607 A1* | 4/2011 | Wang | H04M 3/5116 455/404.1 |
| 2011/0300846 A1 | 12/2011 | Chiu et al. | |
| 2012/0163293 A1* | 6/2012 | Mildh | H04W 12/08 370/328 |

OTHER PUBLICATIONS

Office Action and Search Report issued in Taiwanese Application No. 101128485 dated May 20, 2016.
International Search Report and Written Opinion of the International Searching Authority issued in International Application No. PCT/IB2011/002488 on May 8, 2012; 10 pages.

(Continued)

Primary Examiner — Frantz Bataille
(74) Attorney, Agent, or Firm — Fish & Richardson P.C.

(57) ABSTRACT

In some implementations, a method for managing warning notifications includes identifying a trigger event. A status of a setting in User Equipment (UE) to indicate at least one of enablement or disablement of warning notifications in a wireless system is determined. In response to at least the trigger event, the status of the setting for warning notifications is automatically presented through the UE.

12 Claims, 7 Drawing Sheets

(56) References Cited

OTHER PUBLICATIONS

ATIS/TIA; "Joint ATIS/TIA CMAS Mobile Device Behavior Specification"; vol. TIA J-STD-100; Jan. 30, 2009; pp. 1-20.
3GPP SA3; "UMTS ETWS: Warning Message Display Correction with Regards to Digital Signature Security"; 3GPP TSG SA3 Meeting #64 (S3-110852); Mainz; Jul. 11-15, 2011; 2 pages.
3GPP TS 22.268 V11.1.0 (Mar. 2011); "3rd Generation Partnership Project; Technical Specification Group Services and System Aspects; Public Warning System (PWS) Requirements (Release 11)"; Apr. 1, 2011; pp. 1-13.

\* cited by examiner

METHOD AND DEVICE FOR MANAGING WARNING NOTIFICATIONS

CLAIM OF PRIORITY

This application is a U.S. National Stage of PCT/IB2011/002488 filed on Aug. 5, 2011.

BACKGROUND

Different systems are used in the world to deliver emergency notifications to people. This allows individuals to receive a (possibly life-saving) warning message, sent by the network in a point-to-multipoint way. For example, the ETWS (Earthquake and Tsunami Warning System) system is used in Japan currently for Universal Mobile Telecommunications System (UMTS) (corresponding of the 3GPP Work Item ETWS). This system relies on the older Cell Broadcast legacy technology (CBS, see TS 23.041). ETWS was introduced in the 3GPP Rel-8. In the Rel-9, the Commercial Mobile Alert System (CMAS) was introduced. The 3GPP work Items of CMAS and ETW put together make the Public Warning System (PWS) Work Item. This is also defined in 3GPP LTE.

Generally speaking, unfortunate possibilities exist on any emergency notification system in the world such as a false network sending a false (non-genuine) warning notification to the user(s). The false network could be created by, for example, a prankster to create a panic by sending false warning messages. Those warning messages could be anything such as "There is a fire in the theater, leave now!" Such messages could create a mass panic that would be harmful to people if they try to escape in a hurry from a crowded place, as an example. Some network authentication security schemes could exist to allow the device to spot false messages and, for example, not display it. Though, these security schemes could be "cracked" by non-genuine sources, the network may not have implemented them (e.g. in a deployment scenario), or the network not have activated this security.

For ETWS, the stage 1 in the Rel-8 is defined in TS 22.168. For PWS, the stage 1 starting at the Rel-9 is defined in TS 22.268. The stage 2 that defines the UE behavior is defined in 23.041 for UMTS (as built on CBS) and in the general stage 2 TS 23.401 for LTE. When ETWS started to be specified in the Rel-8, the intention was that this may contain some security features to guards against potential false network.

However, since authenticating the network for a point-to-multipoint scheme is fundamentally different than authenticating a network for a point-to-point scheme (as it already exists in 3GPP), this scheme was not fully completed in the standards. A "digital signature" and "timestamp" was introduced in the standards, and it is possible for the network to provide them to the device via signaling; however, which digital signature algorithm to use, such as how manage the security keys, was not defined in the standards. This omission is acknowledged by 3GPP (see S3-110148), and the Working Group SA3 has started a Rel-11 new Work Item for this (see S3-110204), which goal is to define and introduce a (possibly completely different) security for network authentication for PWS.

Therefore, it is possible that the current security in place in the Rel-8 standards may not be used, and that basically no scenario of "digital signature" or "timestamp" should lead to the prevention of a warning message to be displayed, in the device behavior (see the reply LS from SA3 to CT1, SA1, SA2 in S3-110852, reply to the CT1 LS C1-112199). This is because otherwise, if for some reasons, due to the incomplete security, the device identifies that security failed or is incomplete, then there is a risk that a genuine life-saving message would not be displayed to the user due to the security incorrectly preventing its presentation. Therefore, since safety comes before security, 3GPP is taking the direction to have the warning message always displayed with regards to the digital signature/timestamp security. In practice, this means that text related to digital signature and timestamp (that in some cases was preventing the message to be displayed) may be removed in the Rel8/rel-9/Rel-10 in TS 23.041 (UMTS) and TS 23.401 (LTE). In another scenario, regardless of any removal or change in the specifications, a network may simply decide not to use this security. Therefore, this raises an issue. 3GPP acknowledges that the work to re-introduce security for PWS would not be done before the Rel-11 (the related SA3 Work Item is of the Rel-11), so Rel-8/Rel-9/Rel-10 may possibly not preclude a false network and false warning message attacks.

Generally speaking, it cannot be precluded that, on any warning notification system in the world (and for any release), the security system is "cracked" by non-genuine sources, or the (genuine) network does not implement the network authentication security part, or decides to not activate this security, with the risk for the user(s) to receive a false warning notification.

As for the ability to disable the PWS, from the Rel-8 onwards, the possibility exists in stage 1 for the user to disable the PWS Warning message reception/display. This is basically an on/off switch that is operated by the user. The stage 1 TS 22.168 (Rel-8) and TS 22.268 (Rel-9, Rel-10) specifies that the default setting for this "switch" should be enabled. An extract from TS 22.268 states, "It shall be possible for users to disable (e.g., opt-out) presentation of some or all of the Warning Notifications, subject to regulatory requirements and/or operator policy. The user shall be able to select PWS-UE enabling/disabling options via the User Interface to disable, or later enable, the PWS-UE behavior in response to some or all Warning Notifications." This provision was included so that the life-warning message would always be received by default by the user. A user needing to search in the user manual on how to activate the PWS is undesirable, or even worse, a setting of "disabled" may lead to no possibility of receiving a life-saving message. The user would not be aware of the disabled feature. Though, in order to address that the Rel-8/Rel-9/Rel-10 warning notifications could be used maliciously, SA3 proposed (in the reply LS S3-110852) that the following: (1) the default setting is changed to "disabled" (at the device factory); and (2) the granularity of this setting is changed to a public land mobile network (PLMN) basis as oppose to an overall setting. In these cases, at the factory, the device is preset to include a list of all the networks (PLMNs) that effectively use PWS. For example, if PWS/ETWS is used in Japan and not in the UK or France, the setting would be "on" for NTT DoCoMo Japan and by default "off" for Vodafone UK and "SFR France". No fake messages could be displayed on the Vodafone UK network or SFR France network. Though, the manufacturer cannot know the entire list of PLMNs in the world that use PWS (considering also the scenarios when this list changes over time), and the list of "on/off setting" and the corresponding PLMN Identity will be limited.

A mobile communication device, such as a cellular mobile station, may be capable of making and receiving telephone calls and/or sending and receiving data over a wireless communication network. Before it is able to do this, the mobile station selects and attempts to register with one of a plurality of communication networks which are available within its geographic coverage area. After selecting a PLMN, the mobile station operates in an idle mode where it camps on a particular wireless communication channel. If there is successful PLMN registration, the mobile station monitors for calls or messages. If PLMN registration is not successful, the mobile station may still monitor for emergency calls or warning notifications. In general, PLMN selection includes the mobile station selecting a communication network through which to register and operate.

Cellular telephony operation and PLMN selection schemes are documented in standards specifications that govern the behavior of cellular mobile stations and associated systems. One well-known cellular standard is the Global System for Mobile Communications (GSM) standard. GSM 03.22/European Technical Standards Institute (ETSI) TX 100 930, Technical Specification (TS) 23.122 from the 3.sup.rd Generation Partnership Project (3GPP), and other related standards specifications describe the many details of cellular operation and network selection. These documents describe how a mobile station behaves as it moves and roams between various regions and countries to maintain coverage with networks (referred to as Public Land Mobile Networks or PLMNs), primarily for the purpose of providing continuous telephone service.

DETAILED DESCRIPTION

The detailed description is directed to a system and a method of disabling or enabling presentations of Public Warning System (PWS) notifications to User Equipment (UE). The term UE is a general term for the user device that may equally cover terminologies such as for example Mobile Station (MS), Mobile Equipment (ME), as well as others. For example, the UE may present, in response to at least a trigger event, a notification to the user indicating whether the warning notification is enabled or disabled. Following this, the user may update a setting for presenting received notification, or not, using the UE. This would allow a user to not be mistaken on the status of the setting. In a country using PWS, the user could hence ensure that it is set it to 'enabled' while in this country (to be sure to receive life-saving notifications), and that in a country not using PWS it is set it to 'disabled' while in this country (to be sure to not receive false messages). It should be noted that otherwise, a status as 'disabled' in a country that do not use PWS could remain unnoticed by the user, without automatic indication to the status of the setting to the user. And if the UE roams later to a country that uses PWS, the UE would be unable to notify the user about life saving warning notifications, and the user could be unaware of this and not know that he needs to change the setting. In some implementations, a trigger event may include registration with a PLMN (successful only, or successful and unsuccessful), a PLMN selection, a PLMN registration (successful only, or successful and unsuccessful) or selection without a change of the PLMN, a handover in connected mode, a service selection in a current PLMN, a change in a cell within a current PLMN, a change to a cell in a different PLMN, other events, or a combination of the foregoing. In some implementations, the UE can automatically present a notification as to whether the warning notification is enabled or disabled in the device. This indication may be done, for example, when the device is camped for emergency on a PLMN, when the device is registered with a PLMN, or both. With this, the user would know if it can expect a warning message and would be aware that it has to turn the setting to 'on' if it is erroneously set to 'off' (and vice-versa).

The above could re-apply in scenarios where the user setting for warning notification enabled/disabled is modified to have a finer granularity than an overall "on/off" switch, and/or is controlled by the home network or visited network (possibly in addition of being a user setting). For example, this could re-apply in a scenario where the user setting for warning notification enabled/disabled applies on a PLMN basis. In this case, the device may automatically indicate to the user if the warning message display is enabled or disabled, specifically for the PLMN corresponding to the cell where the device is camped. The UE may indicate the status corresponding to the registered network, the status corresponding to the selected network, or any combination of those. In this case the automatic indication of the UE display status corresponding to the PLMN where the UE is located at the time could be even more useful, because the user would not necessarily remember how this is set for each country by the UE manufacturer, or how this has been modified for each country by the user (for example if a user has modified it a few years back in a country and comes-back to this country years after).

The above could also re-apply if the granularity of the "on/off" setting makes distinction between different classes of warning messages (where some message classes, or message types, could be enabled and other disabled). In this case, more than one status may be indicated to the user (one distinctive status per message class). For example, CMAS makes the distinction between the following types of warning messages (or warning types): (1) Imminent Threat Warning Notifications; (2) child Abduction Emergency Warning Notifications; or (3) Presidential Warning Notifications. So a distinction using two classes of messages for example, between message types (1)+(2), and (3), would be possible. In addition, any other combination of classes is possible without departing from the scope of the disclosure. In addition, a distinction by message types, used in conjunction with the granularity on a PLMN basis, may lead to having one or more settings mapped to each PLMN ID.

Figure 1:
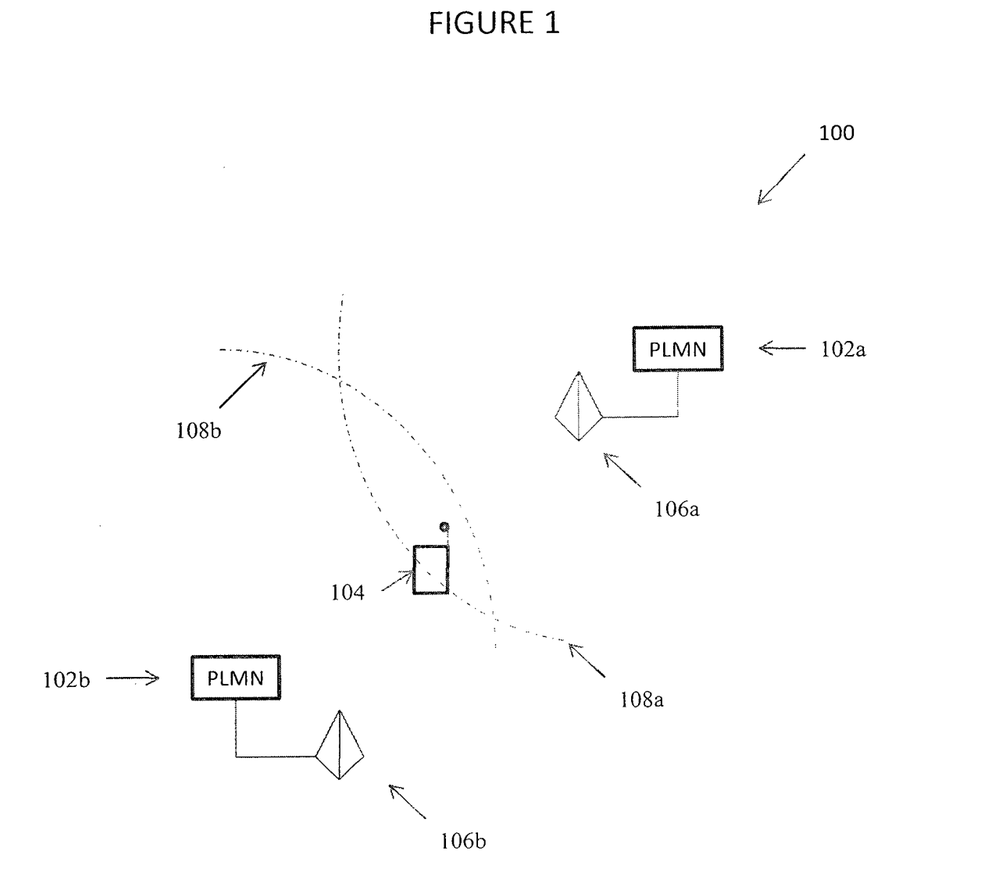
FIG. 1 illustrates an example a wireless system for presenting capabilities of warning notifications of PLMNs.

Turning to a description of environments, FIG. 1 illustrates an example system 100 for updating warning notifications in accordance with some implementations of the present disclosure, including the embodiment where the user setting for warning notification enabled/disabled applies on a PLMN basis. As illustrated, the system 100 includes a first PLMN 102a and a second PLMN 102b configured to communicate with a UE 104. The PLMN 102 includes a base station 106 for wirelessly communicating with the UE 104, which may have a signal coverage area which is partially designated by a dashed line 408. In some implementations, the UE 104 may execute one or more of the following: identify a trigger event associated with a PLMN 102; determine an identity of the PLMN 102 or PLMN ID; retrieve information identifying a mapping between the PLMN IDs and enablement of warning notifications of the associated PLMN 102; automatically present an indication to the user through the UE 104 as to the UE enabling/disabling status of warning notification indication for the corresponding PLMN 102; receive an request for the user of the UE 104 to update a setting associated with warning notifications; or updating the UE 104 to enable or disable to presentation of warning notifications in response to at least the request. By presenting the capabilities of the enabling/disabling status in the UE for the corresponding PLMN 102, the user may be notified if the setting is different to the one uses (e.g., on the Home PLMN) and would hence be able to change this setting if desired. In addition, having information automatically presented to the user could also be useful to avoid a scenario where the user has disabled the setting but does not remember it.

Turning to a more detailed description of the elements, the PLMN 102 wirelessly communicates using the base stations 106. In some implementations, the PLMN 102 can include a plurality of base stations 106. In some implementations, the PLMN 102 is in communication with a network that provides connectivity with other wireless communication systems and wired communication systems. The PLMN 102 may communicate with UE 104 using a wireless technology such as one based on orthogonal frequency division multiplexing (OFDM), orthogonal frequency division multiple access (OFDMA), Single Carrier Frequency Division Multiple Access (SC-FDMA), Discrete Fourier Transform Spread Orthogonal Frequency Division Multiplexing (DFT-SOFDM), space-division multiplexing (SDM), frequency-division multiplexing (FDM), time-division multiplexing (TDM), code division multiplexing (CDM), or others. The wireless communication system may transmit information using medium access control (MAC) and Physical (PHY) layers. In addition, the PLMN 102 may be various wireless communication systems such as a system based on Long Term Evolution (LTE) Global System for Mobile Communication (GSM), Code Division Multiple Access (CDMA), Universal Mobile Telecommunications System (UMTS), Unlicensed Mobile Access (UMA), or others. As previously mentioned, the PLMN 102 may be assigned or otherwise associated with a PLMN ID. In some implementations, PLMN 102a may have a PLMN ID different from a PLMN ID assigned to PLMN 102b. In addition, the PLMN 102 may execute the PWS such that warning notifications may be transmitted to the UE 104. In these instances, the setting corresponding to each PLMN 102 may be mapped to an associated PLMN ID. The PLMN ID may be received from e.g. the Access Network (for example from the Broadcast Channel, BCCH), or from the Core Network (for example from Location Registration accept or reject messages, Locating Accept/Reject or Routing Area Update Accept/Reject, see TS 24.008, or Tracking Area update accept/Reject see TS 24.301), or from the Cell Broadcast Center or Cell Broadcast Entity. More than one PLMN Id may be considered to cover the cases of network sharing (e.g. Multiple Operator Core Network, MOCN), or equivalent PLMN.

The UE 104 may include any software, hardware, firmware, or a combination of the forgoing configured to automatically present whether the UE is enabled/disabled for providing warning notifications such as the PWS. Or, in an embodiment, the UE 104 may include any software, hardware, firmware, or a combination of the forgoing configured to automatically present whether the UE is enabled/disabled for providing warning notifications such as the PWS when received by the PLMN 102. The UE setting corresponding to the PLMN 102 may be presented through a display of the UE, a sound (e.g., voice indication), a vibration, or a combination of the foregoing. For example, the UE 104 may display text such as "Warning Notifications are enabled in this device—please check setting to change this" or "Warning Notifications are disabled in this device—please check setting to change this". This indication could remain on the screen until user action, or disappear automatically after a period of time. Similarly, the UE 104 may wait a predefined period of time before displaying the indication or wait until the trigger event has been completed. In some implementations, this indication may be executed in an "asymmetric way" between the two potential statuses. For example, the indication resulting from the status being enabled could be displayed with bigger fonts on the device than the indication resulting from the status being disabled (or the other way around) or the indication could remain on the screen longer/shorter. In some instances, the indication may only be displayed for specific status such as for only enabled warning notifications or only disabled warning notifications. Alternatively or in addition, the UE 104 may present the setting and also the warning message using other techniques such as, for example, voice indications for blind users.

As previously mentioned, the UE 104 may present a notification in response to a trigger event such as registration with a PLMN (successful/unsuccessful registration, or successful registration only), a PLMN selection, a PLMN registration and/or selection without a change of the PLMN, a PLMN registration and/or selection with a change of the PLMN, a handover in connected mode, a handover in connected mode leading to a new cell in a different PLMN, a service selection in a current PLMN, a change in a cell within a current PLMN, a change of cell to a different PLMN, other events, or a combination of the foregoing. For example, the notification may be presented to the user at PLMN registration rather than PLMN selection or in some of the PLMN registrations and/or PLMN selections. The trigger event may include a PLMN selection that involves a change of the PLMN 102, i.e., the selected PLMN 102 is different than the last selected PLMN 102. In some implementations, the trigger event may include a PLMN registration that involves a change of PLMN 102 such as the registered PLMN is different than the last registered PLMN 102. In some implementations, the trigger event may include a PLMN selection when the selected PLMN is not the Home PLMN 102, i.e., is a Visited PLMN 102. In other words, the UE 104 is roaming. In some implementations, the trigger event may include a PLMN registration when the registered PLMN 102 is not the Home PLMN 102. In some implementations, the trigger event may include the SIM/USIM being changed and/or introduced. For example, this used in conjunction with the trigger of PLMN selection with change of PLMN as follows: PLMN selection with change of PLMN, and/or PLMN selection with SIM/USIM change. This implementations may allow that the user to see the indication at least once when switching-on the UE for the first time, if the UE has already been switched-on in the factory before (e.g., for testing purpose). In some implementations, the trigger event may include a PLMN registration when the registered PLMN 102 is the Home PLMN 102. In some implementations, the trigger event may include a PLMN selection when the selected PLMN is the Home PLMN. In some implementations, the trigger event may be that the UE camps on a cell that belongs to a different PLMN than the previously camped cell. In some implementations, the trigger event may include a successful location registration from TS 24.008 (Location Area Update or Routing Area update) or successful Tracking Area update from TS 24.301 lead to a change of PLMN or registered PLMN. The trigger event may include unsuccessful procedures that lead to change of PLMN or registered PLMN. The trigger may be affected by the fact that the considered PLMN is the Home PLMN, or the Visited PLMN, from all the examples in this application. For example, the trigger may include a successful location registration that lead to a change of PLMN only if the new PLMN is a Visited PLMN. The above trigger events are for illustration purposes only and the trigger event may include some, any combination, all, or none of these examples without departing from the scope of the disclosure. Some restrictions could be added, so that if the combination of triggers may lead to multiple indications or multiple indications (possibly for the same PLMN) in a limited time, then only some of the indications may be presented. Some restrictions could be added, so that if the same trigger leads to multiple indications in a limited time, then only some or one of the indications may be presented. For example, re-using the example of the trigger event including successful PLMN registration with change in PLMN from above, the UE may not perform the indication if the PLMN that is successfully registered has already been registered less than a given time duration before. This omission may avoid a ping-ponging between two networks leading to frequent displays to the user. The time duration may be preset by the user (values reflecting 0 or +infinity are also possible, that would mean a request to not performing the restriction, or a request to never indicate the status, respectively). Note that these implementations are only an example and the "time restriction" may apply to any of the other examples above (PLMN selection, etc. . . . ). In some enhancement, the user would have the possibility to enable/disable this automatic indication.

In some implementations, the UE 104 can present the device setting status (warning notifications enabled/disabled) during both the connected mode and the idle mode. For example, the condition for triggering the display of information to the user may be when the device performs a handover to a new cell from a different PLMN 102 (inter-PLMN handover). While the term handover is used, the UE 104 may present the information in response to any message/command from the PLMN 102 that is associated with switching between PLMNs. In addition, the condition for triggering could be any UE action (other than for example cell reselection) that leads to a change of PLMN (in idle and/or connected mode, or any other mode) and/or this could be any UE action that lead to a change of PLMN into a Visited PLMN (or that lead to a change of PLMN into the Home PLMN). Again those triggers could be used in conjunction. For example, when successful location registration from TS 24.008 (Location Area Update or Routing Area update) or Tracking Area update from TS 24.301 lead to a change of PLMN or registered PLMN. In some implementations, the trigger event may be that the device has performed a cell reselection or cell change (in idle mode and/or connected mode) to a new cell in a different PLMN 102. In some implementations, the trigger event may include one or more of the scenarios described above even if the granularity of the setting is an overall on/off setting, and not necessarily a setting applicable per PLMN.

An overall setting as decided by the user may enable or disable the automatic presentation of the status of warning notifications. In other words, the UE 104 may receive a request to enable or disable presenting the setting status to the user. This setting that may update the automatic indications of enabling/disabling may be limited to affect the automatic indications that are provided only when the UE is roaming (not in the Home PLMN). Or, it may be limited to affect the automatic indications that are provided only when the UE is not roaming. Or, it may be limited to affect the automatic indications that indicate "enabled" only. Or, it may b eliminated to affect the automatic indications that indicate "disabled" only. Other limitations, or combinations of the previous limitations, may be considered. The value of this overall setting may also be modified by the Home PLMN or a Visited PLMN, via OMA-DM, or dedicated signaling. In some implementations, the information on the "message display setting" for the considered PLMN 102 may be presented to the user for the PLMN 102, where the UE 104 is camped but after a user action. Rather than providing a big list of PLMNs with their status, the UE 104 may indicate the status of the PLMN 102 of the cell where the UE 104 is camped (or selected PLMN 102, or the registered PLMN 102), after that the user has chosen a given menu option, performed a given action, pressed a given button, other actions, or a combination of the foregoing.

It should be noted that while the examples in this document may relate to 3GPP ETWS, CMAS or PWS for UMTS or LTE, it is not precluded that the examples of ideas, methods or solutions described in this document re-apply to 3GPP GERAN for warning notifications based or not on the Cell Broadcast Service (CBS). Similarly, this is not limited to 3GPP and re-use of any of those ideas, methods or solutions for other systems such as the ones based on the IEEE or IETF standards are possible. For example, other systems may include the ones developed by the IETF Authority-to-Citizen Alert (atoca) working group, by the standards bodies ATIS (for example by the WTSC committee and the G3GSN and JCMAS subcommittees, for example using the broadcast SMS), by the TIA standards body (for example the TR45.5), by the ETSI EMTEL committee, by the EU-Alert system, and/or by other systems or committees.

In general, the UE 104 may receive and transmit wireless and/or contactless communication with the system 100. As used in this disclosure, the UE 104 are intended to encompass cellular phones, data phones, pagers, portable computers, SIP phones, smart phones, personal data assistants (PDAs), digital cameras, MP3 players, camcorders, one or more processors within these or other devices, or any other suitable processing devices capable of communicating information with the PLMN 102. In some implementations, the UE 104 may be based on a cellular radio technology. For example, the UE 104 may be a PDA operable to wirelessly connect with an external or unsecured network. In another example, the UE 104 may comprise a smartphone that includes an input device, such as a keypad, touch screen, mouse, or other device that can accept information, and an output device that conveys information associated with a PLMN 102 executing the PWS, including digital data, visual information, or Graphical User Interface (GUI) 110.

The GUI 110 comprises a graphical user interface operable to allow the user of the UE 104 to interface with at least a portion of the system 100 for any suitable purpose, such as authorizing presenting enablement of warning notifications. Generally, the GUI 110 provides the particular user with an efficient and user-friendly presentation of data provided by or communicated within the system 100 and/or also an efficient and user-friendly means for the user to self-manage settings and access services offered by the PLMN 102. The GUI 110 may comprise a plurality of customizable frames or views having interactive fields, pull-down lists, and/or buttons operated by the user. The term graphical user interface may be used in the singular or in the plural to describe one or more graphical user interfaces and each of the displays of a particular graphical user interface. The GUI 110 can include any graphical user interface, such as a generic web browser or touch screen that processes information in the system 100 and presents the results to the user.

Figure 2A:
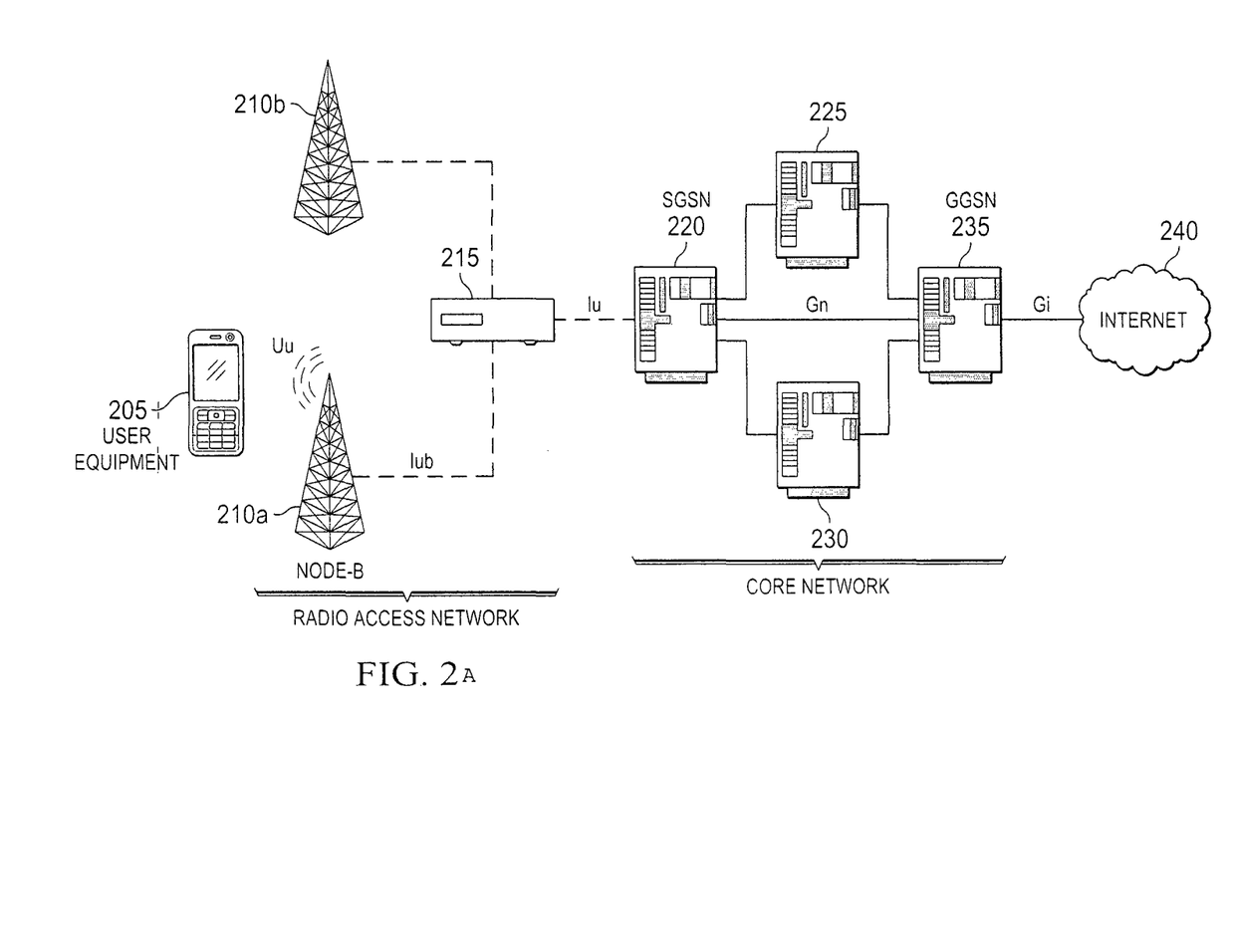
FIGS. 2A and B illustrate an example PLMN and associated warning system of FIG. 1 based on UMTS.
Figure 2B:
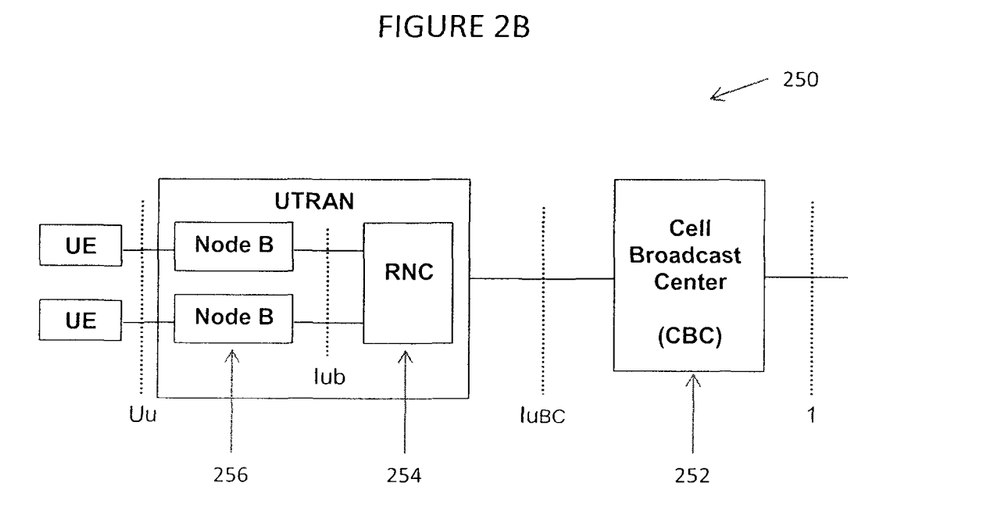

FIGS. 2A and 2B illustrate an example PLMN 102 and Cell Broadcast Center (CBC) 252 based on Universal Mobile Telecommunications System (UMTS). Referring to FIG. 2A, the PLMN 102 includes a UMTS-based radio access network (RAN), which is referred to as a UTRAN, and a 3GPP GPRS packet-switched core network. The core network provides connectivity to an external network such as the Internet 240. The PLMN 102 includes one or more base stations such as Node-B base stations 210*a*, 210*b* that provide wireless service(s) to one or more devices such as UEs 205. A radio network controller (RNC) 215 can control the Node-B base stations 210*a*, 210*b*. The RNC 215 and the Node-B base stations 210*a*, 210*b* form a RAN. The PLMN 102 include can include system elements 220, 225, 230, 235 that perform one or more communication functions such as connection establishment and data routing. For example, the system includes a Serving GPRS Support Node (SGSN) 220 that is responsible for routing traffic within a core network. The system includes a Gateway GPRS Support Node (GGSN) 235 that is responsible for enabling the ingress/egress of traffic from/to the Internet 240. The GGS 235 can allocate IP addresses to UEs 205.

The network interfaces, for a UMTS-based system, include the Uu interface defined between a UE and a Node-B, the Iub interface defined between a Node-B and a RNC, the Iu interface defined between a RNC and a SGSN, the Gn interface defined between a SGSN and a GGSN, the Gi interface defined between a GGSN and an external packet data network. User-plane connectivity through the radio access network and core network can require the establishment of network interfaces between the UE and Node-B (e.g., Uu interface), Node-B and RNC (e.g., Iub interface), RNC and SGSN (e.g., Iu interface), SGSN and GGSN (e.g., Gn interface), and GGSN and the Internet (e.g., Gi interface). The establishment of one or more of these network interfaces can be associated with a radio connection state or sub-state as a function of the current activity level. For example, the Uu, Iub and Iu connections may be established only when required for active user-plane data communication.

Referring to FIG. 2B, the basic network structure 250 of a Cell Broadcast Center (CBC) 252 is illustrated. The basic network structure 250 may replaces the GSM BSS with the UTRAN containing the RNC 254 and the Node B 256. The cell broadcast center (CBC) 252 is part of the core network and connected to a routing node e.g. a 3G SGSN via the Bc reference point. Thus the CBC 252 can reach the RNCs 254 via the Iu interface. On the logical interface between the CBC 252 and the RNC 254 a mandatory protocol may be defined. The other UTRAN related interfaces are described in the according UTRAN specifications based on the RAN 2 3GPP TR 25.925. Based on this architecture and the current requirements for cell broadcast, the core network elements like MSC, VLR, HLR and others may not be involved for the service delivery.

Figure 3A:
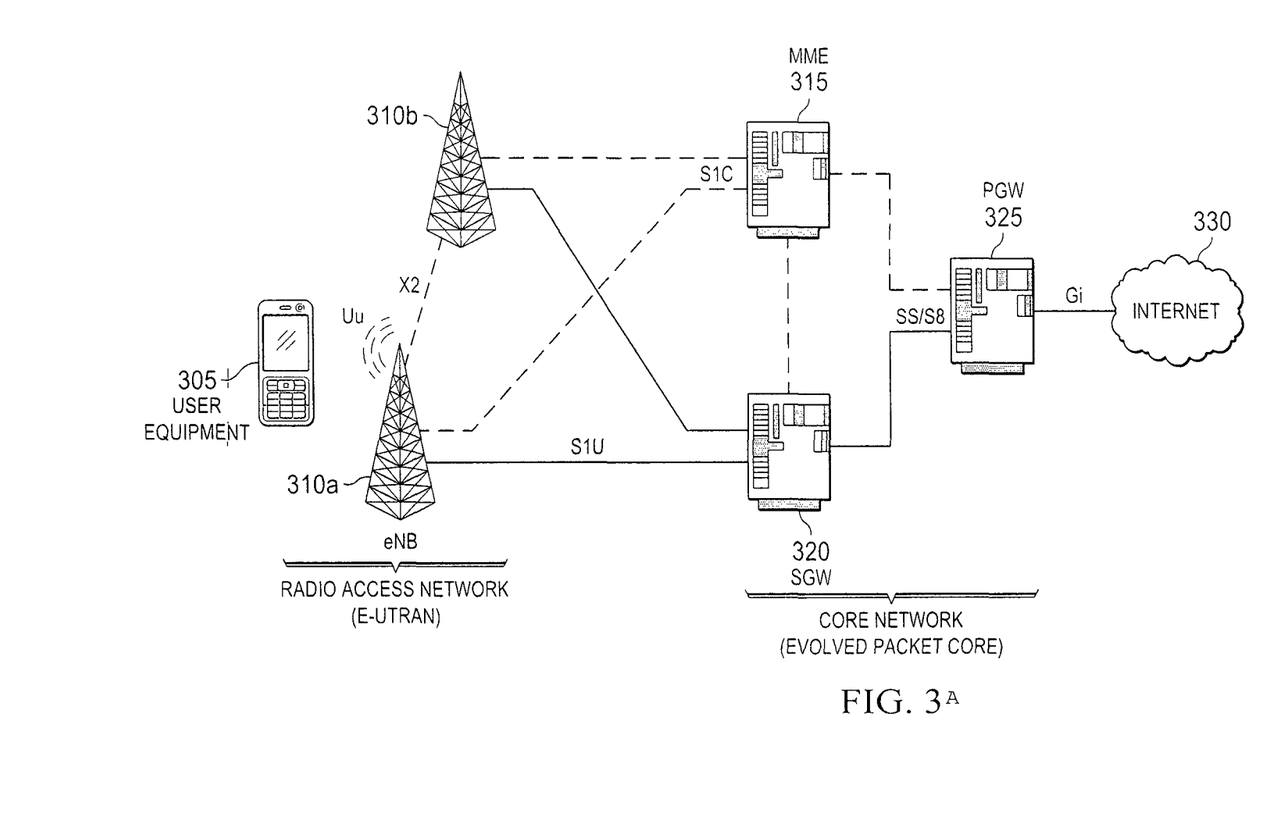
FIGS. 3A and 3B illustrate an example PLMN and associated warning system of FIG. 1 based on LTE.
Figure 3B:
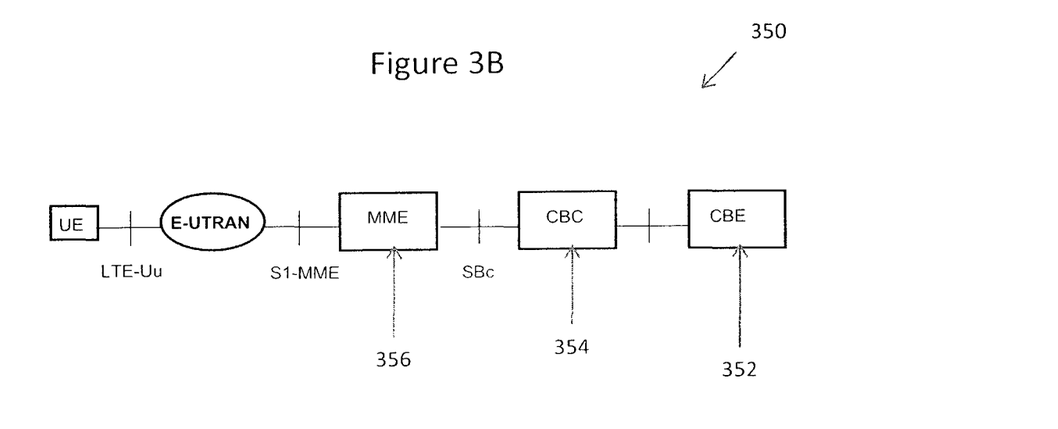

FIGS. 3A and 3B show an example PLMN 102 and based on Long Term Evolution (LTE). Referring to FIG. 3A, the PLMN 102 includes a core network called an Evolved Packet Core (EPC) and a LTE Radio Access Network, e.g., evolved UTRAN (E-UTRAN). The core network provides connectivity to an external network such as the Internet 330. The PLMN 102 includes one or more base stations such as eNode-B (eNB) base stations 310*a* and 310*b* that provide wireless service(s) to one or more devices such as UEs 305.

An EPC-based core network can include a Serving Gateway (SGW) 320, a Mobility Management Endpoint (MME) 315, and a Packet Gateway (PGW) 325. The SGW 320 can route traffic within a core network. The MME 315 is responsible for core-network mobility control attachment of the UE 305 to the core network and for maintaining contact with idle mode UEs. The PGW 325 is responsible for enabling the ingress/egress of traffic from/to the Internet 330. The PGW 325 can allocate IP addresses to the UEs 305.

A LTE-based wireless communication system has network interfaces defined between system elements. The network interfaces include the Uu interface defined between a UE and an eNB, the S1U user-plane interface defined between an eNB and a SGW, the SIC control-plane interface defined between an eNB and a MME (also known as S1-MME), and the S5/S8 interface defined between a SGW and a PGW. Note that the combination of S1U and S1C is often simplified to "S1."

Referring to FIG. 3B, the network structure 350 illustrates network architecture for warning systems. In particular, the structure 350 includes a Cell Broadcast Entity (CBE) 352, a Cell Broadcast Centre (CBC) 354, and a Mobility Management Entity (MME) 356. The CBE 352 may sends emergency information (e.g. "warning type", "warning message", "impacted area", "time period") to the CBC 354. The CBC 354 may authenticate this request. Using the "impacted area" information, the CBC 354 may identify the MME 356 to contact and determine the information to be place into the Warning Area Information Element. The CBC 354 may send a Write-Replace Warning Request message containing the Warning message to be broadcast and the delivery attributes (Message identifier, Serial Number, Tracking Area ID list, Warning Area, OMC ID, CWM Indicator) to MME 356.

Figure 4:
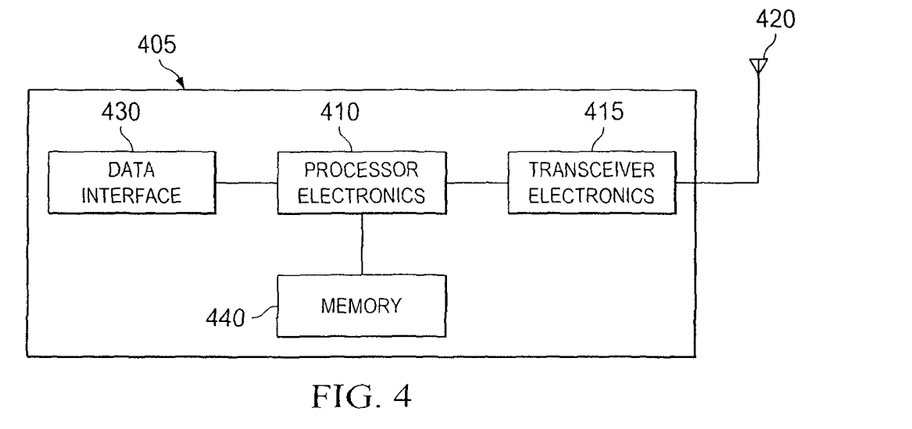
FIG. 4 illustrates an example UE of FIG. 1.

FIG. 4 shows an example UE 104 that includes processor electronics 410 such as a processor that implements one or more of the techniques presented in this document. A UE 104 can include transceiver electronics 415 to send and receive wireless signals over one or more communication interfaces such as one or more antennas 420. A UE 104 can include other communication interfaces for transmitting and receiving data. In some implementations, a UE 104 can include one or more wired network interfaces to communicate with a wired network. In other implementations, a UE 104 can include one or more data interfaces 430 for input/output (I/O) of user data (e.g., text input from a keyboard, graphical output to a display, touchscreen input, vibrator, accelerometer, test port, or debug port). A UE 104 can include one or more memories 440 configured to store information such as data and/or instructions. In still other implementations, processor electronics 410 can include at least a portion of transceiver electronics 415.

Figure 5:
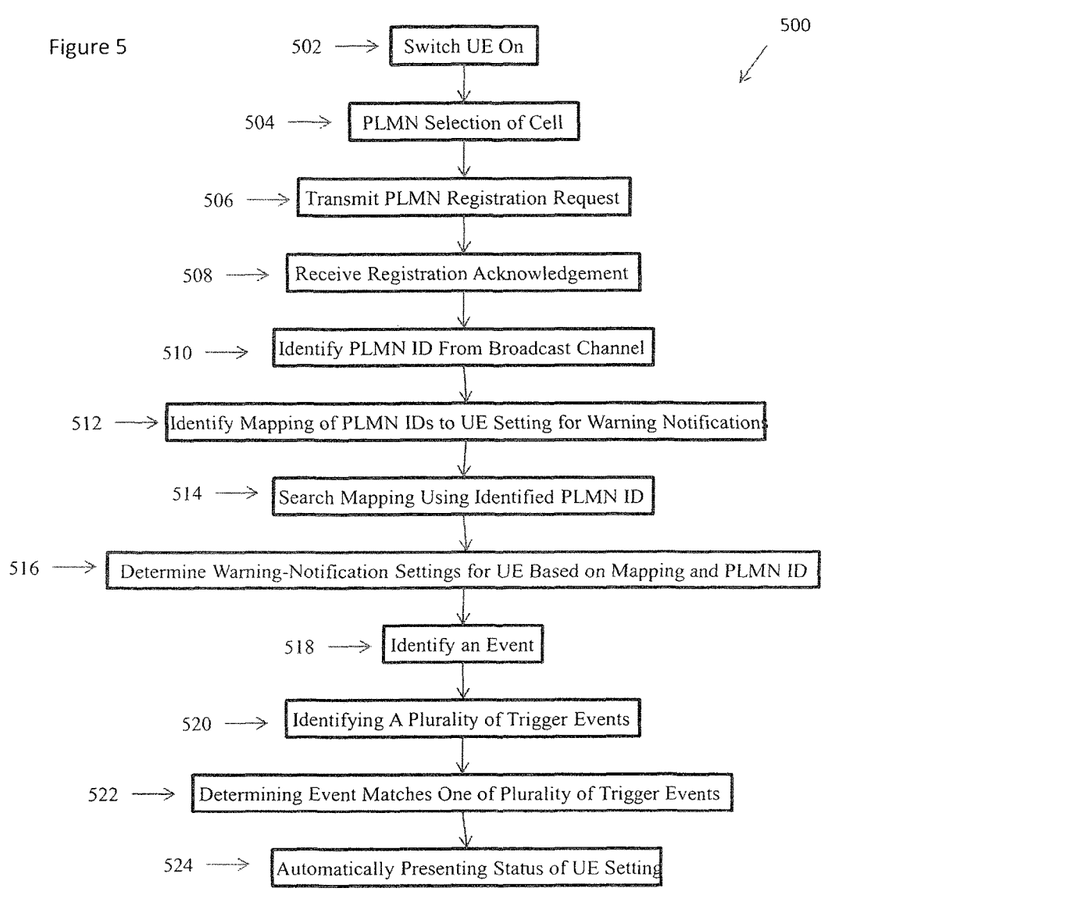
FIG. 5 is a flow chart illustrating an example method for presenting a status of a setting in the UE for warning notifications.

FIG. 5 is a flow chart illustrating an example method 500 for presenting capabilities of warning notifications for PLMNs. The illustrated method 500 is described with respect to system 100 of FIG. 1, but this method could be used by any other suitable system. Moreover, system 100 may use any other suitable techniques for performing these tasks. Thus, many of the steps in this flowchart may take place simultaneously and/or in a different order than the order shown. System 100 may also use methods with additional steps, fewer steps, and/or different steps, so long as the methods remain appropriate. In addition, the method 500 is directed to implementations with the setting in the UE on a per PLMN basis, and the system 100 may have settings based on other granularities without departing from the scope of the disclosure.

Method 500 begins at step 502 where the UE 104 is turned on or otherwise activated. At step 504, the UE 104 executes a PLMN selection of cell of the PLMN 102. For example, the UE 104 may store a default PLMN 102 or may determine one or more attributes of the PLMN 102a and 102b, which is used to make a selection. Next, at step 506, the UE 104 transmits a PLMN registration request to the selected PLMN 102. The UE 104 receives the registration acknowledgement at step 508. In some implementations, method 500 may be implemented when registration is not successful without departing from the scope of the disclosure such as when using emergency services. At step 510, the UE 104 identifies the PLMN ID of the selected PLMN 102 based, at least in part, on information broadcasted by the PLMN 102, on information provided by the Core Network (e.g., MSC, SGSN, MME) of the PLMN 102, and/or on information provided by the Cell Broadcast Center or Cell Broadcast Entity. Next, at step 512, the UE 104 retrieves a mapping between PLMN IDs and UE setting for warning notifications from memory (or SIM/USIM). For example, the UE 104 may store a table matching PLMN IDs to whether warning notifications are indicated to the user for this PLMN. At step 516, the UE 104 determines the warning-notification setting of the UE for the selected PLMN 102 based, at least in part, on the mapping and the broadcasted PLMN ID. Note that if the UE setting is not on a PLMN basis, the UE does not need to perform the retrieving of mapping between PLMN IDs and UE setting for this PLMN. The UE 104 identifies an event at step 518 and identifies a plurality of trigger events at step 520. Next, at step 522, the UE determines the event matches at least one of the plurality of trigger events. The UE 104 automatically presents the warning-notification capability to the user at step 524.

What is claimed:

1. A method for managing warning notifications, comprising:
   selecting, by a User Equipment (UE), a Public Land Mobile Network (PLMN);
   identifying a PLMN identity (ID) of the PLMN;
   retrieving a warning notification configuration, wherein the warning notification configuration includes a mapping between a plurality of PLMN IDs and a plurality of UE settings, each of the plurality of PLMN IDs maps to one of the plurality of UE settings, each of the plurality of PLMN IDs corresponds to a respective PLMN, and each of the plurality of UE settings indicates whether to enable or disable warning notifications received through a PLMN corresponding to a PLMN ID that is mapped to the respective UE setting;
   based on the mapping and the identified PLMN ID, determining a status of a setting in the UE to indicate at least one of enablement or disablement of warning notifications in the PLMN independent of receiving the status from the PLMN; and
   in response to at least the determining, automatically presenting the status of the setting for warning notifications through the UE.

2. The method of claim 1, further comprising:
   receiving a selection from a user of the UE to update a setting for automatic indication of the status through the UE; and
   updating the setting for the automatic indication of the status.

3. The method of claim 1, wherein presenting the status includes at least one of displaying information using the UE or emitting an audio signal.

4. The method of claim 1, wherein the UE operates in a Global System for Mobile Communication (GSM) network, Universal Mobile Telecommunications System (UMTS) network, or a Long Term Evolution (LTE) network.

5. A User Equipment (UE), comprising:
one or more processors configured to:
   select a Public Land Mobile Network (PLMN);
   identify a PLMN identity (ID) of the PLMN;
   retrieve a warning notification configuration, wherein the warning notification configuration includes a mapping between a plurality of PLMN IDs and a plurality of UE settings, each of the plurality of PLMN IDs maps to one of the plurality of UE settings, each of the plurality of PLMN IDs corresponds to a respective PLMN, and each of the plurality of UE settings indicates whether to enable or disable warning notifications received through a PLMN corresponding to a PLMN ID that is mapped to the respective UE setting;
   based on the mapping and the identified PLMN ID, determine a status of a setting in the UE to indicate at least one of enablement or disablement of warning notifications in the PLMN independent of receiving the status from the PLMN; and
   in response to at least the determining, automatically present the status of the setting for warning notifications through the UE.

6. The UE of claim 5, the one or more processors further configured to:
   receive a selection from a user of the UE to update a setting for automatic indication of the status through the UE; and
   update the setting for the automatic indication of the status.

7. The UE of claim 5, wherein presenting the status includes at least one of displaying information using the UE or emitting an audio signal.

8. The UE of claim 5, wherein the UE operates in a Global System for Mobile Communication (GSM) network, Universal Mobile Telecommunications System (UMTS) network, or a Long Term Evolution (LTE) network.

9. A computer program product encoded on a non-transitory, tangible storage medium, the product comprising computer readable instructions for causing at least one processor to perform operations comprising:
   selecting, by a User Equipment (UE), a Public Land Mobile Network (PLMN);
   identifying a PLMN identity (ID) of the PLMN;
   retrieving a warning notification configuration, wherein the warning notification configuration includes a mapping between a plurality of PLMN IDs and a plurality of UE settings, each of the plurality of PLMN IDs maps to one of the plurality of UE settings, each of the plurality of PLMN IDs corresponds to a respective PLMN, and each of the plurality of UE settings indicates whether to enable or disable warning notifications received through a PLMN corresponding to a PLMN ID that is mapped to the respective UE setting;
   based on the mapping and the identified PLMN ID, determining a status of a setting in the UE to indicate at least one of enablement or disablement of warning notifications in the PLMN independent of receiving the status from the PLMN; and in response to at least the determining, automatically presenting the status of the setting for warning notifications through the UE.

10. The computer program product of claim 9, wherein the operations further comprise:

receiving a selection from a user of the UE to update a setting for automatic indication of the status through the UE; and updating the setting for the automatic indication of the status.

11. The computer program product of claim 9, wherein presenting the status includes at least one of displaying information using the UE or emitting an audio signal.

12. The computer program product of claim 9, wherein the UE operates in a Global System for Mobile Communication (GSM) network, a Universal Mobile Telecommunications System (UMTS) network or a Long Term Evolution (LTE) network.

* * * * *